Dec. 4, 1945.　　　R. C. ADAMS　　　2,390,286
PORTABLE ELEVATOR
Filed Dec. 6, 1944　　　2 Sheets-Sheet 1
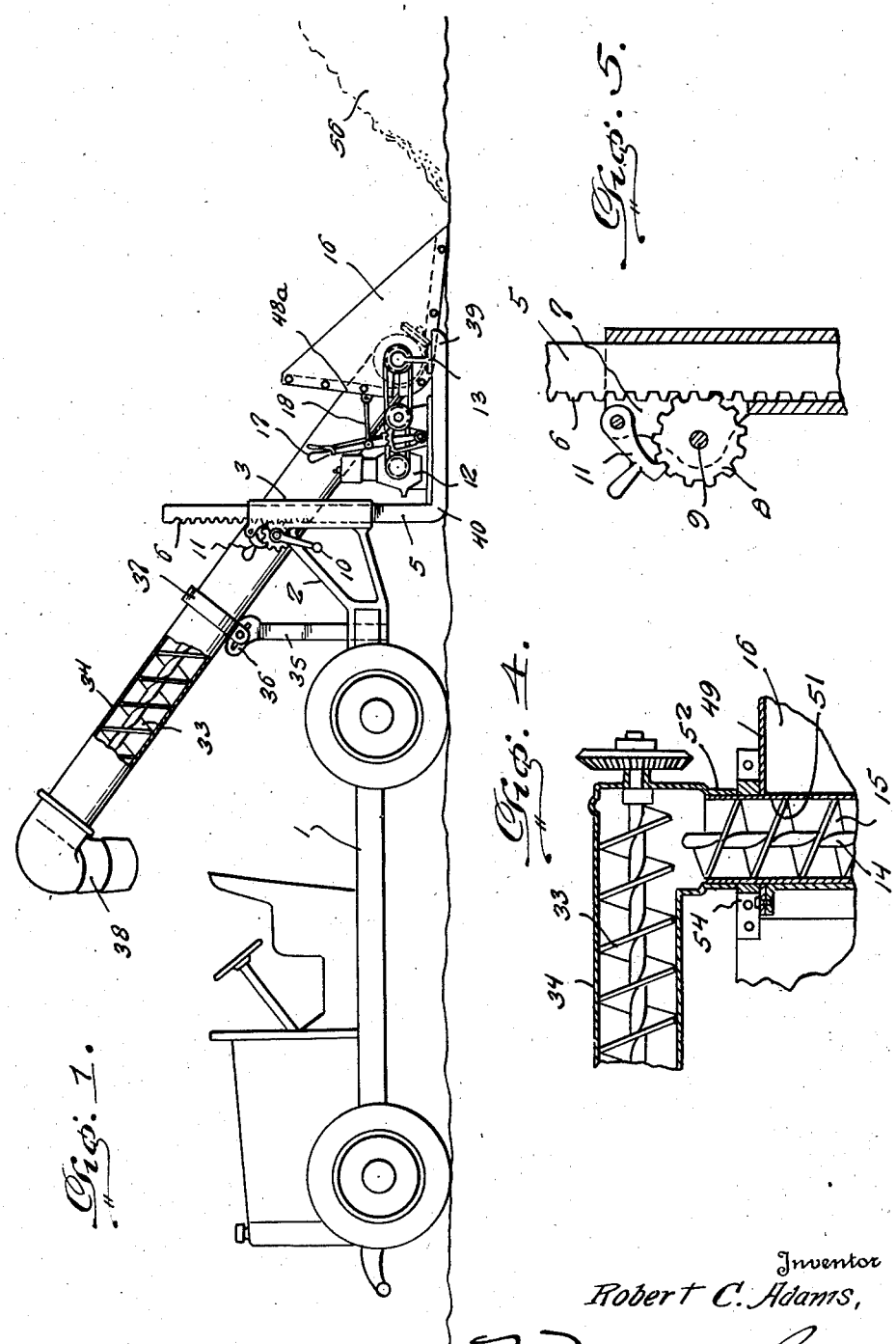
Inventor
Robert C. Adams,
By
Attorneys

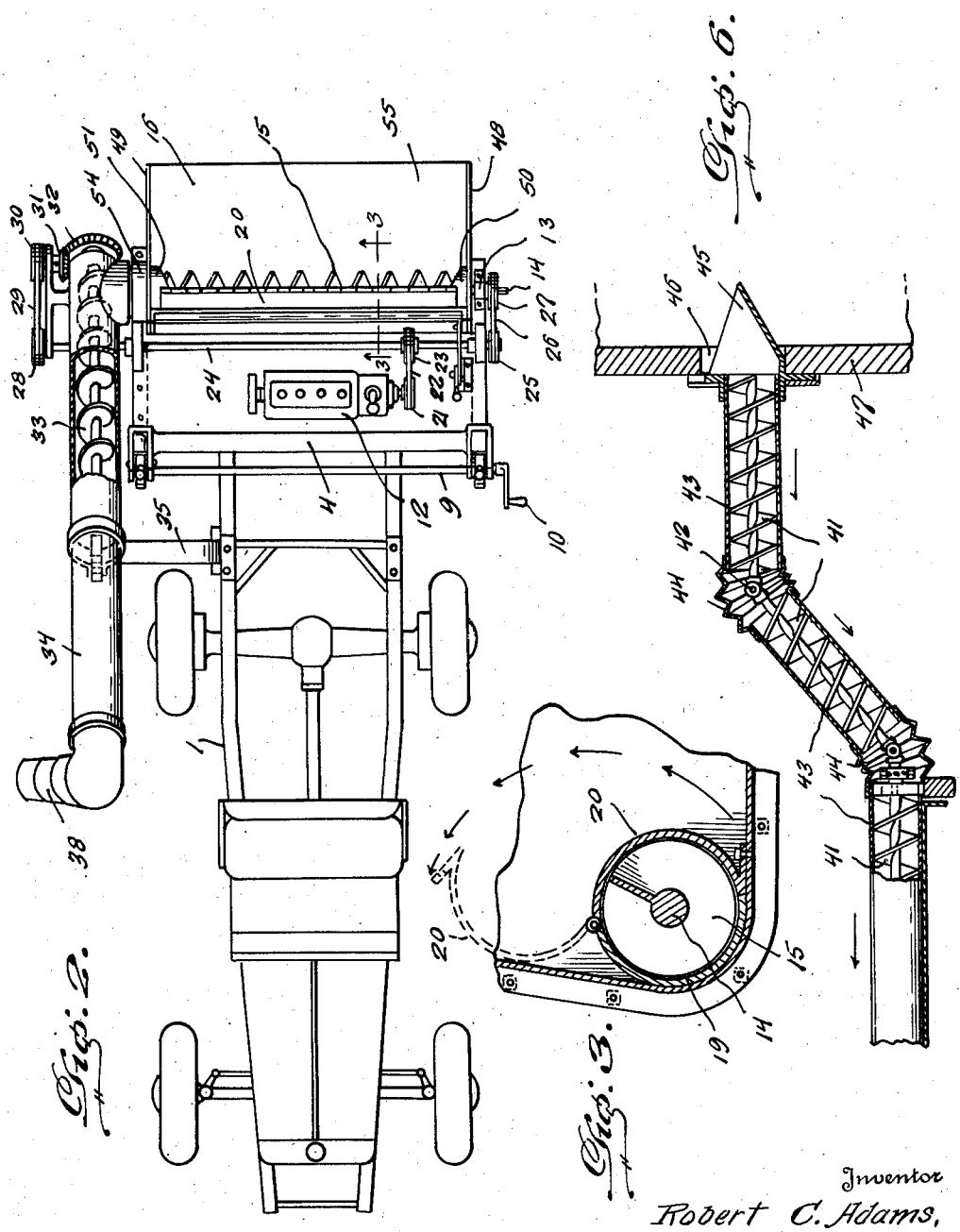

Patented Dec. 4, 1945

2,390,286

UNITED STATES PATENT OFFICE 2,390,286

PORTABLE ELEVATOR

Robert Clinton Adams, El Cerrito, Calif.

Application December 6, 1944, Serial No. 566,788

4 Claims. (Cl. 198—7)

This invention relates to grain loaders, and more particularly to a portable grain loading mechanism.

A main object of this invention is to provide a portable grain loading mechanism which can be used to elevate grain piled at ground level and transfer the grain to a bin or receiving truck with a minimum of shoveling.

A further object of this invention is to provide a portable grain loading mechanism which can be used to transfer grain from a bin or hopper and convey it to a receiving truck or receptacle.

A further object of this invention is to provide a portable grain loading mechanism which can be conveniently adjusted to meet loading requirements.

Further objects of this invention will become apparent from the following description and claims, and from the accompanying drawings, wherein:

Figure 1 is a view in elevation of the portable grain loading mechanism of this invention in operative position with part of the conveyor member broken away to show the internal structure.

Figure 2 is a plan view of the mechanism of Figure 1.

Figure 3 is a sectional view taken on line 3—3 of Figure 2, showing the details of the scoop conveyor elements according to this invention.

Figure 4 is a sectional view showing the details of the junction between the scoop conveyor and the riser conveyor of the loading mechanism of Figure 1.

Figure 5 is a detail view showing the lifting mechanism for the loading scoop.

Figure 6 is a view, partly in section, of a conveyor element as employed to convey the grain from a bin or hopper in accordance with the teachings of this invention.

Referring to the drawings, I designates a motor truck chassis provided at its rear portion with a bracket structure 2 comprising hollow vertical posts 3 and horizontal cross bars 4 rigidly united and firmly secured to truck chassis 1. Slidably mounted in vertical posts 3 are a pair of L-shaped frame members 5 provided with rack elements 6 on the upper portions thereof. Integrally formed on each of the posts 3 is an extension 7 upon which is journaled a pinion 8 operatively engaged with rack element 6, the pinions 8 being secured to shaft 9, journaled in the respective extensions 7 and having a crank 10 at one end thereof for manual actuation of the rack and pinion mechanism to raise frame members 5. A locking dog 11 is pivotally mounted on each of the extensions 7, and is formed with a locking tooth to engage the respective pinions 8 to normally lock the lifting mechanism. By manually raising locking dogs 11, the mechanism can be released.

The horizontal lower arms of frame members 5 extend rearwardly and carry a platform on which is mounted a prime mover 12 and supporting bracket 13 in which is journaled a shaft 14 carrying a helical conveyor worm 15.

Extending transversely of the main platform and containing worm 15 is a scoop member 16, comprising a flat bottom portion 55, a substantially vertical rear wall portion 48a and a pair of triangular side wall portions 48 and 49. The angle of elevation of scoop member 16 can be adjusted by the operation of an adjusting linkage comprising hand lever 17, pivoted to the main platform and link 18 connected between hand lever 17 and the vertical wall portion 48a of scoop 16. Hand lever 17 is provided with a conventional pawl and ratchet locking mechanism which can be released by grasping the hand lever when it is desired to change the angle of elevation of scoop 16 with respect to the main platform.

Helical conveyor worm 15 is provided with a substantially cylindrical housing 19, a portion 20 of which is adapted to swing open to the dotted line position shown in Figure 3. Portion 20 extends substantially the width between the walls of scoop member 16 and is manually raised to expose the conveyor worm after the scoop has been adjusted to operating position.

Adjacent the vertical triangular walls 48, 49 of scoop member 16, housing 19 comprises cylindrical portions 50 and 51. Portion 50 terminates at wall 48 and shaft 14 passes through an opening therein providing a journal bearing for scoop 16 at that point. Cylindrical portion 51 passes through wall 49 of scoop 16 and extends a short distance beyond, being rotatably received in a laterally extending cylindrical extension 52 of a cylindrical riser housing 34 which contains a worm conveyor 33. A bracket member 54 is employed to clamp portion 51 to the main platform. Wall 49 of scoop 16 is journaled on cylindrical portion 51 at the point of passage of said cylindrical portion through wall 49. Scoop 16 may thus be rotated to vary its angle of elevation.

Worm 15 is actuated from prime mover 12 by a conventional belt and pulley arrangement comprising a driving pulley 21 mounted on the prime mover shaft, a belt 22 and a pulley 23 mounted on a countershaft 24 supported in appropriate bearings on brackets mounted on the main platform. At one end of countershaft 24 is a drive pulley 25 connected by a belt 26 to a pulley 27 operatively secured to worm shaft 14.

The other end of countershaft 24 is provided with another drive pulley 28 connected by a belt 29 to a pulley 30 geared by bevel gears 31, 32 to a riser worm conveyor 33 extending upwardly in inclined cylindrical housing 34 and supported therein by appropriate bearings. Cylindrical housing 34 is supported in its inclined position by a laterally offset vertical bracket member 35 rigidly supported on truck chassis 1 and provided at its upper end with a slotted abutment portion 36 against which housing 34 is supported and to which said housing is adjustably secured by a split collar 37 whose ends are pinned together by a bolt, which also passes through the slot in abutment portion 36.

The upper end of housing 34 carries a spout element 38 for delivering the grain to a bin or vehicle.

The operation of the loading mechanism is as follows: The truck chassis 1 is positioned so that its rear portion is adjacent a heap of grain 56 which is to be transferred to a bin, or vehicle under spout 38. Locking dogs 11 are released allowing the frame structure carrying the scoop member 16 to be locked. Hand lever 17 is actuated to adjust scoop member 16 to a desired depressed position and the truck chassis is backed into the pile of grain 56 after starting prime mover 12 and raising the cover portion 20 of worm 15 to the exposed position. As scoop 16 digs into the pile of grain 56, the grain is caught up by worm 15 and transferred through the worm housing 19 to riser worm 33, which carries the grain upwardly through riser worm housing 34 to discharge spout 38 for delivery to the receptacle positioned beneath said spout. This process may be continued until substantially the bulk of the grain has been transferred from the heap, the remaining small quantities being shoveled into the scoop 16 so as to be caught up by worm 15.

The bottom rear corners of the horizontal lower arms of the L-shaped frame members are rounded off, as shown at 39, to provide a skid structure whereby truck chassis 1 may be backed into the heap of grain with a minimum of friction from the ground. The front corners are similarly rounded at 40 so that the truck chassis may move back and forth as required without the necessity of raising frame members 5.

The slot in bearing portion 36 allows limited movement of riser housing 34 as frame members 5 are raised or lowered. The rotatable fit between cylindrical portion 51 and extension 52 permits free angular movement of riser housing 34 during the raising or lowering of said frame members.

In Figure 6, an attachment is disclosed which may be used in conjunction with the loading mechanism of this invention, for conveying grain from a bin or hopper to a desired receptacle. In place of the worm 15 and scoop 16, a series of conveyor worm sections 41, joined by universal couplings 42 and appropriately provided with housing sections, 43 connected by accordion joints 44, to give the desired length, may be employed. The loading end is provided with a scoop member 45 which fits into an opening 46 in the grain bin 47. The unloading end may be connected to riser conveyor worm 33 and actuated by a belt and pulley arrangement in the same manner as disclosed for connecting and actuating worm 15 in Figures 1 to 5. As long as the grain level in bin 47 is above the level of opening 46, the mechanism of Figure 6 may be thus employed to transfer the grain to riser worm 33 and riser housing 34, and thence to the desired receptacle by way of spout 38.

While specific embodiments of this invention have been disclosed in the foregoing description, it is to be understood that various modifications may be made within the spirit of the invention. Therefore, it is intended that no limitations be placed on the invention other than as defined by the scope of the appended claims.

What is claimed is:

1. A portable grain elevator for elevating grain piled on the ground and delivering it to a desired receptacle comprising a mobile chassis, a platform at the rear of said chassis, means for raising or lowering said platform with respect to said chassis, scoop means adjustably mounted on said platform and adapted to be adjusted to substantially ground-engaging position when the platform is lowered, a worm conveyor extending transversely of said scoop means and positioned therein, said worm conveyor being adapted to catch up grain forced into said scoop means when the mobile chassis is moved rearwardly with the platform and scoop means in depressed positions into a pile of grain on the ground, and a riser worm conveyor communicating with said transverse worm conveyor and supported in vertically inclined position with its upper end adapted to be positioned over the receptacle into which it is desired to deliver the grain.

2. The structure of claim 1, and wherein said platform is provided at the bottom thereof with skid means adapted to rest on the ground when the platform is in lowered position, said skid means having rounded forward and rear edges to minimize ground friction when the chassis is moved forwardly or rearwardly with the platform in lowered position.

3. The structure of claim 1, and wherein means is provided for normally closing off said transverse worm conveyor, said closing means being adapted to be opened to expose the conveyor to the grain when the elevator is in operation.

4. A portable elevator for elevating material piled on the ground and delivering it to a desired receptacle comprising a mobile chassis, a platform at the rear of said chassis, means for raising or lowering said platform with respect to said chassis, scoop means adjustably mounted on said platform and adapted to be adjusted to substantially ground-engaging position when the platform is lowered, a worm conveyor extending transversely of said scoop means and positioned therein, said worm conveyor being adapted to catch up material forced into said scoop means when the mobile chassis is moved rearwardly with the platform and scoop means in depressed position into a pile of material on the ground, a riser worm conveyor communicating with said transverse worm conveyor, and means for adjustably supporting said riser worm conveyor in vertically inclined position with its upper end adapted to be positioned over a receptacle into which it is desired to deliver the material, said adjustable supporting means consisting of a vertical support having its lower end rigidly secured to said mobile chassis, and a vertically inclined slot in its other end adapted to slidably receive therein a transverse bolt carried by said riser worm conveyor.

ROBERT CLINTON ADAMS.